UNITED STATES PATENT OFFICE.

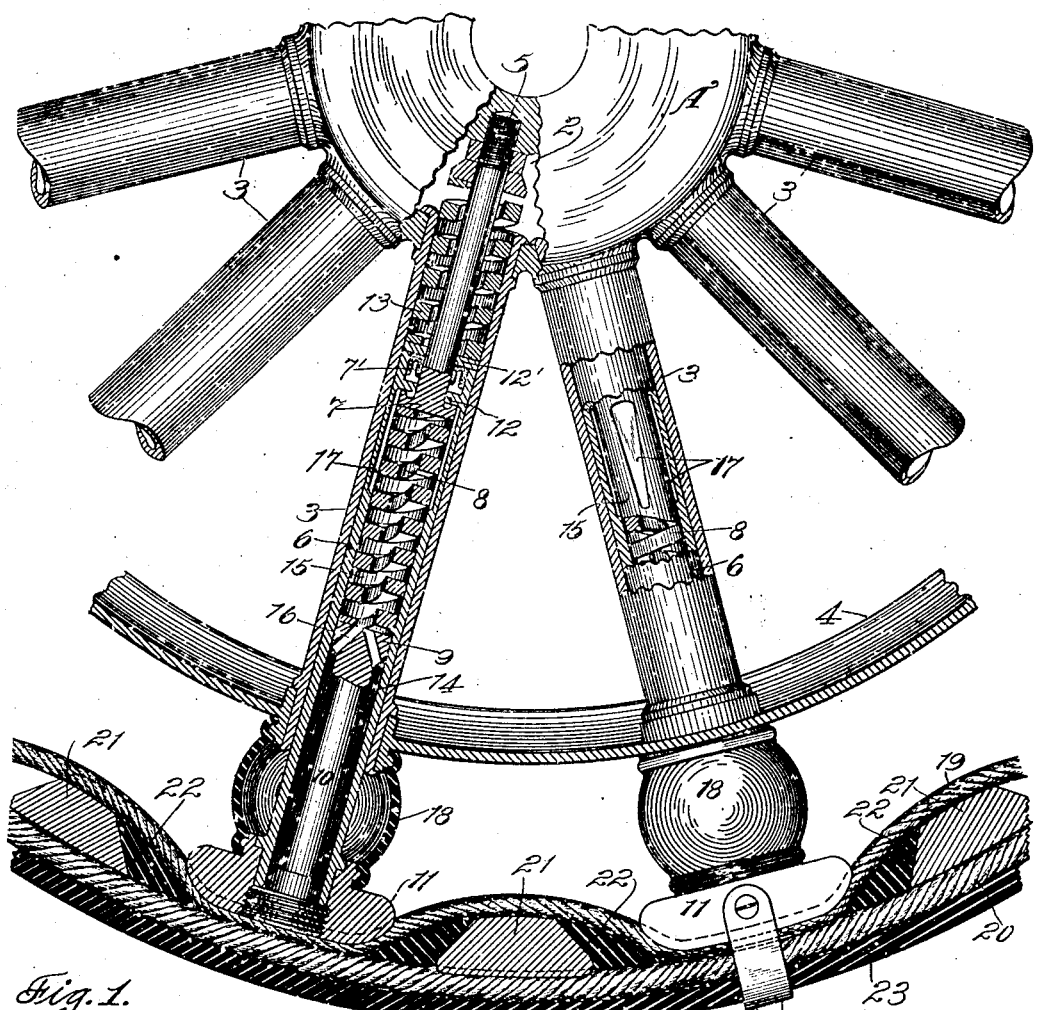
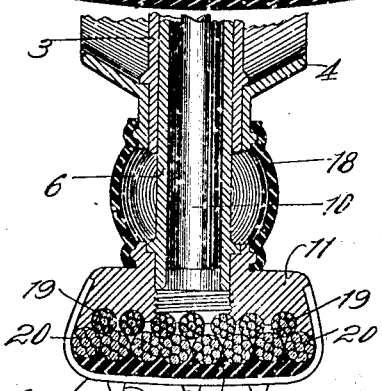

GUSTAV AUBERLIN, OF THE UNITED STATES NAVY.

FLEXIBLE METALLIC VEHICLE-WHEEL.

No. 887,567.  Specification of Letters Patent.  Patented May 12, 1908.

Application filed April 4, 1907. Serial No. 366,292.

*To all whom it may concern:*

Be it known that I, GUSTAV AUBERLIN, United States Navy, citizen of the United States, residing at Mare Island, in the county of Solano and State of California, have invented new and useful Improvements in Flexible Metallic Vehicle-Wheels, of which the following is a specification.

My invention relates to vehicle wheels and especially to automobiles and like wheels. Its object is to provide a flexible or elastic vehicle wheel which will do away with the expense and trouble of pneumatic tires.

The invention consists of the parts and the construction and combination of parts as hereinafter more fully described and claimed, having reference to the accompanying drawings, in which—

Figure 1 is a portion of a wheel having a spoke in section illustrating my improvements. Fig. 2 is a detail sectional view across the tire and portion of a spoke.

A represents a hollow steel hub inclosing the air tight chamber 2.

3 represents hollow, rigid spoke-sections having their inner ends secured in the hub and being suitably supported and braced at their outer ends by the annulus 4.

5 is a bolt suitably anchored in the hub and extending up into the hollow spoke 3 and through the inner end of the hollow piston or telescoping spoke section 6, which latter is adapted to have a smooth sliding fit with the interior of the fixed spoke section 3. The bolt 5 is provided with a head 7 inside of the section 6, and this head forms a seat for one end of the spiral expansion spring 8. The other end of the spring abuts against the head 9 of a stem 10 which is screwed into the expanded foot-piece 11 secured to the outer end of the hollow sliding section 6.

The parts 3—6 constitute a telescoping sectional spoke, and the function of the spring 8 is to hold these sections in normal extended position; the outward movement of the section 6 inside of section 3 being limited by means of the flange 12 on the inner end of the section 6 coming in contact with the underside of the head 7. The strength and tension of the spring 8 are proportioned to the load to be supported by the wheel. This spring 8 may be supplemented in exerting outward thrust on the head 11, either by pneumatic pressure stored in the hub chamber 2 or by means of the spring 13 housed in the hub and spoke, and having one end supported against the hub and the other end against the end 12' of the spoke section 6.

In order to prevent undue shock and wear and in order to render the operation of the parts noiseless, I may fill the section 6 with oil, glycerin, or other suitable liquid. The head 9 of the stem 10 divides the interior of section 6 into two compartments 14—15, and in order to allow the contained liquid to pass freely from one compartment to the other, the head 9 is provided with the ports 16; also the walls of the telescoping section 6 are provided with tapered grooves 17 to allow the passage of the liquid from compartment 15 in behind the head 7 whenever the spring 8 is compressed. A tight joint behind the head 7 is provided by the cup leathers 7'. These grooves have their greatest width at their commencement nearest the hub and gradually narrow down to a point farthest from the hub, thereby decreasing the amount of oil passing through the grooves as the compression increases and making it possible for a quick return of the telescoping section to initial position when the compressive force is removed. This contained oil acts as a shock absorber.

A soft rubber collar 18 is adapted to be snapped over suitable rounded shoulders on the foot-piece 11 and the adjacent fixed portion of the wheel for the purpose of excluding the dirt and moisture from between the parts 6—3.

The foot-pieces 11 are suitably grooved to receive two sets of galvanized steel wire cables 19—20 which compose my wheel rim. These cables 19 and 20 are laid one on top of the other, and their size and number, and the width of the thread provided by them, all depend on the requirements of the wheel and the uses to which it is to be put. Preferably the outer set of cables 20 are larger than the inner set as shown. Interposed between these two sets of cables and between the several spokes is a grooved rigid distance piece 21 flanked on either side by the grooved elastic rubber blocks 22. The arrangement of these distance pieces and the cables is such that a truss construction of rim is produced wherein the inner cables 19 are inwardly arched between the spokes to support the pieces 21, and the outer cables 20 are caused to lie normally in a true circle; also such tendency as there may be for the outer cables to sag when passing over unevenesses in the roadway, will be overcome and the load will be distributed to the adjacent spokes without detriment to the efficiency of the wheel. At the same time this rim is sufficiently elastic to adapt itself to the inward movement of the spokes when under compression.

If it is desired to protect the outer cables which come in contact with the roadway and to render the car more noiseless, or for any other reasons, I may stretch a solid rubber tire as 23 over the cables; this rubber tire being suitably grooved on its inner side to receive the cables.

As protection against skidding and also as a means for holding the tires 23 and cables in place, I may employ the metal clips 24 which are arranged at suitable intervals around the circumference of the wheel and adapted to embrace the cables and tire, and may be secured either to the distance-pieces 21 or to the footpieces 11. These clips 21 are furnished with suitable heads or lugs 25 which engage the roadway and prevent slipping.

It will be manifest that various changes may be made in the details of construction herein described without departing from the principle of the invention.

Having thus described my invention, what I claim and desire to secure by Letters Patent, is—

1. A vehicle-wheel comprising a hub, yielding spokes, and a rim composed of an inner and outer series of flexible cables and means for spacing them apart.

2. A vehicle-wheel comprising a hub, yielding spokes and a rim, the latter composed of flexible cables, said cables arranged in inner and outer series with distance-pieces between the series and between the spokes, and a rubber-tire-section surrounding the outer set of cables and interposed between the latter and the roadway.

3. A vehicle-wheel comprising a hub, yielding spokes and a rim, the latter composed of flexible cables, said cables arranged in inner and outer series with distance-pieces between the series and between the spokes, clips provided with lugs surrounding the cables, and suitable supports for the clips.

4. In a vehicle-wheel, the combination with the hub and rim, of a hollow rigid spoke section secured to the hub, a hollow section telescoping with said rigid section, a bolt secured to the hub and extending up into the sections, a stem secured to the outer end of the telescoping section, elastic means interposed between the stem and said bolt to push the telescoping section normally outward, and means to limit said outward movement.

5. In a vehicle-wheel, the combination with the hub and rim, of a hollow rigid spoke section secured to the hub, a hollow section telescoping with said rigid section, a bolt secured to the hub and extending up into the sections, a stem secured to the outer end of the telescoping section, elastic means interposed between the stem and said bolt to push the telescoping section normally outward, said bolt having a head within the telescoping section, ports connecting the spaces on the two sides of the head of said bolt, and a liquid contained in the telescoping section and flowable through said ports on the inward and outward movement of the telescoping section.

6. In a vehicle-wheel, the combination with the hub and rim, of a hollow rigid spoke section secured to the hub, a hollow section telescoping with said rigid section, a bolt secured to the hub and extending up into the sections, a stem secured to the outer end of the telescoping section, elastic means interposed between the stem and said bolt to push the telescoping section normally outward, means to limit said outward movement, and other elastic means acting against the hub and against the inner end of the telescoping section to push the latter outward.

7. In a vehicle-rim, the combination with the hub and rim, of a hollow rigid spoke section secured to the hub, a hollow section telescoping with said rigid section, a bolt secured to the hub and extending up into the sections, a stem secured to the outer end of the telescoping section, elastic means interposed between the stem and said bolt to push the telescoping section normally outward, means to limit said outward movement, a footpiece carried by the telescoping section and supporting the rim, and a flexible collar interposed between the footpiece and fixed section.

In testimony whereof I have hereunto set my hand in presence of two subscribing witnesses.

GUSTAV AUBERLIN.

Witnesses:
S. H. NOURSE,
FREDERICK E. MAYNARD.